United States Patent [19]

Rieck et al.

[11] 4,259,863

[45] Apr. 7, 1981

[54] MULTI-AXIS LOAD CELL

[75] Inventors: Gerlad C. Rieck, Sterling Heights; Antoni J. Malarz, Warren, both of Mich.

[73] Assignee: General Motors Corporation, Detroit, Mich.

[21] Appl. No.: 99,328

[22] Filed: Dec. 3, 1979

[51] Int. Cl.³ .............................................. G01L 1/04
[52] U.S. Cl. .................................. 73/862.04; 73/141 A
[58] Field of Search .......... 73/133 R, 141 A, 133 MC

[56] References Cited

U.S. PATENT DOCUMENTS

| | | | |
|---|---|---|---|
| 3,272,006 | 9/1966 | Eckard et al. | 73/141 A |
| 3,309,922 | 3/1967 | Green | 73/141 A |
| 3,939,704 | 2/1976 | Zipin | 73/133 MC |
| 4,023,404 | 5/1977 | Brendel | 73/133 MC |
| 4,092,854 | 6/1978 | Henry et al. | 73/133 MC |
| 4,099,409 | 7/1978 | Edmond | 73/133 MC |

Primary Examiner—Donald O. Woodiel
Attorney, Agent, or Firm—Edward J. Biskup

[57] ABSTRACT

A multi-axis load cell including a housing having a circular opening, a hub member having three radially extending arms is supported within the housing by a plurality of spring members and has a cylindrical portion located in the circular opening. A ring member forms a part of the housing and is provided with three circumferentially spaced posts each of which supports a screw connected to a spring member. The screw in each post is adapted to apply a radial force to the associated spring so as to achieve concentric positioning of the cylindrical portion relative to the circular opening. The housing also carries an adjustable force applier that engages the ring member for rotating the latter for achieving mechanical zero adjustment of arms formed on the hub member.

2 Claims, 5 Drawing Figures

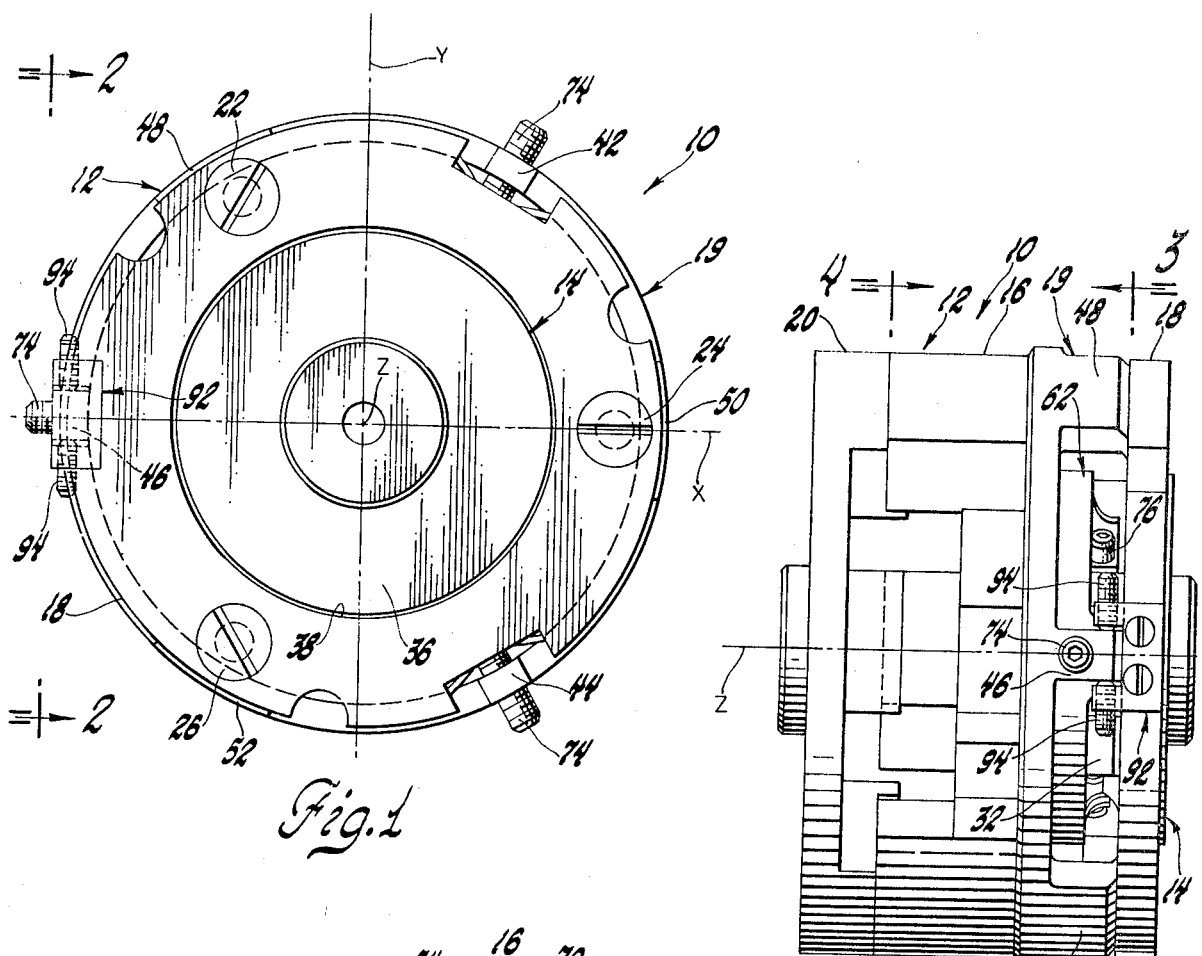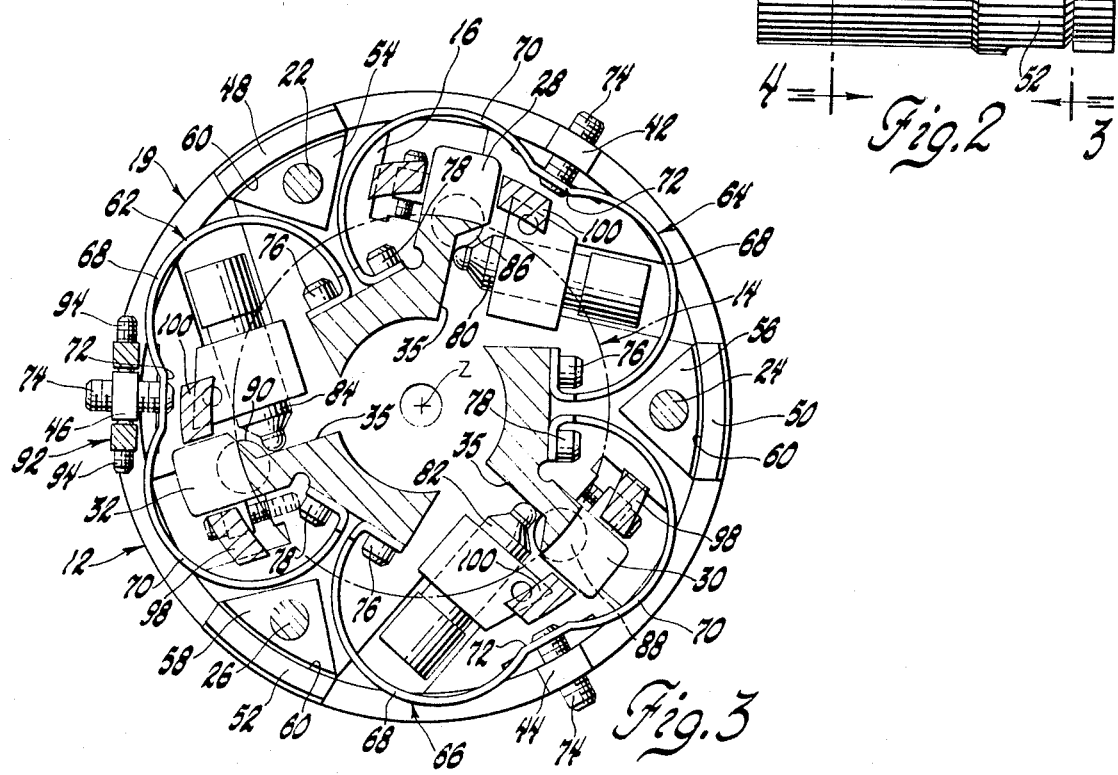

MULTI-AXIS LOAD CELL

This invention relates to force measuring load cells and more particularly concerns a multi-axis load cell which serves to measure forces and bending moment components exerted thereon.

One form of a multi-axis load cell heretofore used includes a housing provided with a circular opening at one end thereof. A hub member is disposed within the housing and is formed with three radially extending arms and a planar surface portion. The hub member is formed with a cylindrical portion opposite the planar surface portion that is normally located in the circular opening in the housing. Three loop-shaped springs are provided for yieldably connecting the hub member to the housing so as to allow the hub member to move relative to the housing. In addition, first and second transducer means are provided which respectively engage the planar surface portion and the arms of the hub member for measuring relative displacement between the housing and the hub member and generating signals corresponding to such movement whereby the load exerted through the springs can be determined.

One problem with a load cell of the type described above, is that each of the loop-shaped springs connecting the hub member to the housing are not exactly identical when manufactured. As a result, upon completion of the assembly of the load cell, the hub member is frequently not properly positioned to provide a uniform gap between the cylindrical portion of the hub member and the circular member in the housing and also between each of the three arms and a mechanical stop fixed with the housing. To achieve the perfect centering of the hub member, one solution is to shim the parts on a trial and error basis which at times can take several hours. Another method of realizing accurate centering of the hub member would be to manufacture a large quantity of springs and attempt to select three springs which are identical. As should be apparent, neither of these solutions is satisfactory.

Accordingly, the present invention is directed to a new and improved load cell device which incorporates adjustable means which work through non-identical loop-shaped springs for achieving mechanical zeroing of the hub member. More specifically, the load cell device made in accordance with the present invention employs a ring member that is mounted on and forms a part of the housing of the load cell. The ring member is provided with three circumferentially equally spaced posts each of which supports a screw that is connected to a portion of one of the springs. The screws can be selectively adjusted axially to apply a radial force to the associated spring to thereby concentrically locate the cylindrical portion of the hub member in the circular opening of the housing. In addition, the housing carries an adjustable force applier that engages the ring member for rotating the latter relative to the housing with resultant rotation of the hub member about its longitudinal axis so that the three radially extending arms thereof can be zero adjusted.

A more complete understanding of the present invention can be derived from the following detailed description when taken with the drawings in which:

FIG. 1 is a top plan view of a load cell made in accordance with the present invention;

FIG. 2 is a side elevational view of the load cell of FIG. 1 taken on line 2—2 thereof;

FIG. 3 is a sectional view taken on line 3—3 of FIG. 2;

Figure 4:
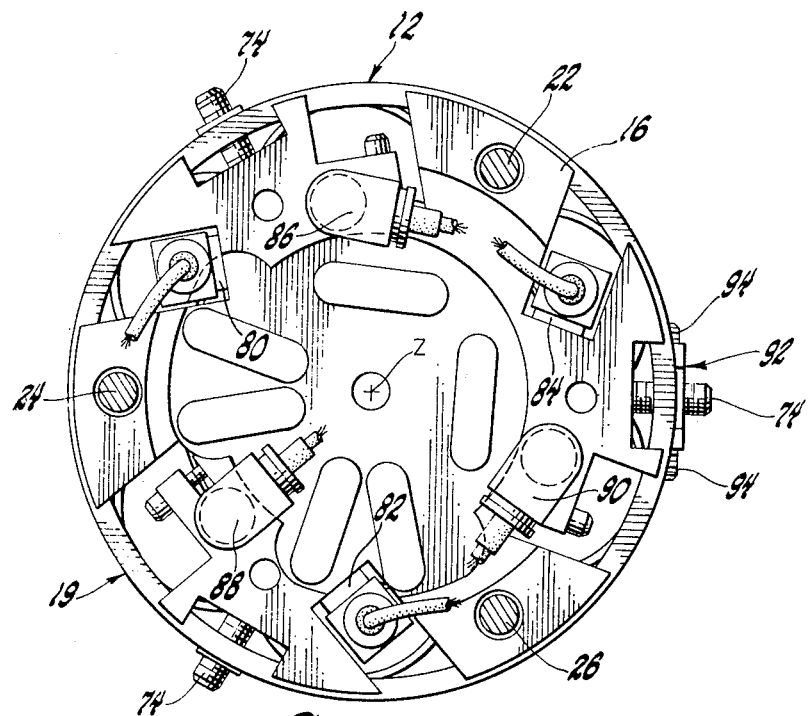
FIG. 4 is a sectional view taken on line 4—4 of FIG. 2.

Referring now to the drawings and more particularly 1 and 2 thereof, a load cell 10 made in accordance with the present invention is shown comprising a housing assembly 12 and a relatively movable hub member 14 disposed therein. The housing assembly 12 includes a body portion 16, a top annular member 18, a ring member 19 and a bottom annular member 20. The top and bottom annular members 18 and 20 are rigidly connected to the body portion by three identical machine screws 22, 24 and 26 which extend through suitable apertures formed in the body portion and hold the housing assembly 12 together. When the load cell 10 is in use, the annular member 20 would be connected to the work end of a program-controlled multi-axis manipulator (not shown) and the hub member 14 would be secured to a hand-operated force load transferring structure.

Figure 5:
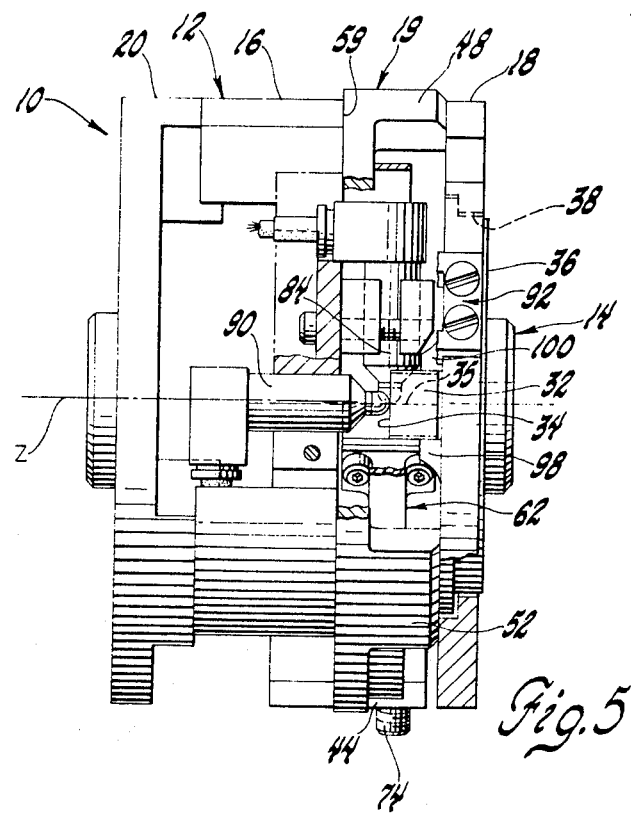
FIG. 5 is a view similar to FIG. 2 with parts broken away so as to show more clearly some of the detailed parts of the load cell.

As seen in FIGS. 3 and 5, the hub member 14 is formed with three identical radially extending arms 28, 30 and 32 which are circumferentially equally spaced from each other. Each of the arms 28, 30 and 32 is formed with a lower flat surface portion 34 lying in a common plane that is substantially normal to the longitudinal center axis of the load cell 10 indicated in the drawings as an axis Z. Each of the arms 28, 30 and 32 is also formed with a flat surface portion 35 which lies in a plane normal to the plane of the surface portion 34 and which intersects the center of the hub member 14. A cylindrical portion 36 is integrally formed with the arms 28, 30 and 32 opposite the surface portions 34 and is located in a stepped circular opening 38 formed in the top annular member 18.

The ring member 19 is interposed between the body portion 16 and the top annular member 18 and is adapted to be rotatably adjusted relative to the body portion 16 in a manner to be described. The ring member 19 is formed with three circumferentially equally spaced posts 42, 44, 46 and three circumferentially equally spaced projections 48, 50 and 52. Each projection 48, 50 and 52 is located midway between a pair of adjacent posts.

The top annular member 18 rests upon three bosses 54, 56, 58 (see FIG. 3), which are pie-shaped in cross section and are integral with and extend from the body portion 16. Also, the ring member 19 rests upon an annular shoulder 59 integrally formed with the body portion 16 and has the inner curved surface 60 of each projection 48, 50 and 52 located adjacent to and in sliding contact with the curved outer surface of the bosses 54, 56 and 58 respectively. Thus, the projections 48, 50 and 52 serve as guides about which the ring member 19 can be adjustably rotated as will be explained hereinafter.

The hub member 14 is supported within the housing assembly 12 by three double loop springs 62, 64 and 66. As seen in FIG. 3, each of the springs 62, 64 and 66 comprises a pair of curved sections 68 and 70 between which an intermediate flat portion 72 is provided with an aperture (not shown) in which one end of a screw 74 is piloted and threadably supported by an associated post formed with the ring member 19. The ends of sections 68 and 70 of each spring 62, 64 and 66 are fastened to the hub member 14 by screws 76 and 78 and serve to support the hub member within the housing assembly 12. As is common in load cells of this type, the springs 62, 64 and 66 serve as centering means for the hub member 14 and are readily deflectable to provide means for creating relatively slight resistance to relative movement between the hub member 14 and the housing assembly 12. Thus, the springs 62, 64 and 66 provide a recentering biasing force on the hub member 14 when the latter is deflected in response to an application of a force in the longitudinal direction of the load cell as indicated by the axis Z seen in FIG. 2 and also any bending forces about the X and Y axes which are mutually perpendicular to the Z axis and to each other as seen in FIG. 1.

As seen in FIG. 3, a first set of three linear variable differential transformers 80, 82, 84, also known as LVDT displacement transducers, are fixed to the body portion 16 and are disposed in pinwheel fashion about the longitudinal axis "Z" of the load cell. The transducers 80, 82 and 84 respectively engage the surface 35 of the arms 28, 30 and 32 formed on the hub member 14. As is conventional, the displacement of the arms 28, 30 and 32 about the axis "Z" are mathematically related to the X and Y force components experienced by the load cell as well as the bending moment exerted about the Z axis.

As seen in FIGS. 3–5, a second set of LVDT transducers 86, 88 and 90 are fixed in the body portion 16 and extend parallel to the Z axis. The transducers 86, 88 and 90 respectively engage the planar surface 34 of the arms 28, 30 and 32 of the hub member. This surface 34 is located so that it passes precisely through the longitudinal center line of the LVDT transducers 80, 82 and 84 so as to minimize or eliminate the cross influencing of the two transducer sets created by combined force and moment loading. The LVDT transducers 86–90 measure relative displacement between the hub member 14 and housing assembly 12 created by forces transmitted by the load cell with components along the Z axis and bending moment components about the X and Y axes so that taken with the LVDT transducers 80, 82 and 84, X, Y and Z force components may be resolved as well as bending moments about each of the X, Y and Z axes.

Over load protection is provided by a pair of depending stops 98 and 100 formed on the lower surface of the top annular member 18 and disposed on opposite sides of each arm 28, 30 and 32.

As should be apparent from the above, the two sets of transducers serve to measure the relative displacement between the hub member 14 and the housing assembly 12 created by the flexing of the springs under load. In addition, the hub member 14 can be mechanically zero adjusted very quickly when non-identical springs are used for supporting the hub member 14 within the housing assembly 12. In this regard, and as aforementioned, the ring member 19 includes three adjusting screws 74 each of which is capable of moving axially relative to the associated post. As a result, once the load cell 10 is assembled and it is found that the cylindrical portion 36 of the hub member 14 is not concentric with the circular opening 38 in the top annular member 18, then the screws 74 can be axially moved to realize the perfect positioning of the cylindrical portion 36 relative to the circular opening 38. Moreover, a clevis 92 is fixed with the top annular member 18 as seen in FIG. 2, and includes a pair of depending legs which straddle the post 46. Each leg of the clevis 92 has a screw 94 extending therethrough and engaging one side of the post 46. Thus, by adjusting one and then the other of the screws 94, the ring member 19 can be rotated about the Z axis so as to carry the intermediate portion 72 of springs 62, 64 and 66 and in turn the hub member 14 in the same direction about the Z axis and provide mechanical zero adjusting of the hub members relative to the stops 98 and 100. Thus, by utilizing the adjusting screws 74 mounted in each of the posts of the ring member 19 as well as the screws 94 in the clevis 92 fixed with the top annular member 18, the hub member 14 can be adjusted to obtain mechanical zero adjustment very quickly.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a multi-axis load cell of the type having a housing provided with a circular opening at one end thereof, a hub member disposed within the housing and formed with a planar surface portion and three radially extending arms each of which is located between a pair of stop members, a cylindrical portion formed on said hub member opposite said planar surface portion and located in said circular opening, three loop-shaped springs yieldably connecting the hub member and the housing so as to allow said hub member to move relative to said housing, and first and second transducer means respectively engaging said planar surface portion and said arms for measuring relative displacement between the housing and the hub member and generating signals corresponding thereto whereby the load exerted through the springs may be determined; the improvement wherein a ring member forms a part of said housing and is provided with first adjustable means which support a portion of each spring and serve to apply a force to the associated spring to assure that said cylindrical portion is concentrically located in said opening, and second adjustable means carried by said housing and engaging said ring member for rotating the latter relative to the housing with resultant rotation of the hub member about its axis so that said arms are mechanically zero adjusted relative to said stop members.

2. In combination with a multi-axis load cell of the type having a housing provided with a circular opening at one end thereof, a hub member disposed within the housing and formed with a planar surface portion and three radially extending arms each of which is located between a pair of stop members, a cylindrical portion formed on said hub member opposite said planar surface portion and located in said circular opening, three loop shaped springs yieldably connecting the hub member and the housing so as to allow said hub member to move relative to said housing, and first and second transducer means respectively engaging said planar surface portion and said arms for measuring relative displacement between the housing and the hub member and generating signals corresponding thereto whereby the load exerted through the springs may be determined; the improvement wherein a ring member forms a part of said housing and is provided with three circumferentially equally spaced posts, axially adjustable means mounted in each post for supporting a portion of one of said three springs and serving to selectively apply a force to said one of said three springs to assure that said cylindrical portion is concentrically located in said opening, and a clevis carried by said housing and including adjustable means for engaging said ring member for rotating the latter relative to the housing with resultant rotation of the hub member about its axis so that said arms are mechanically zero adjusted relative to said stop members.

* * * * *